United States Patent [19]

Chen et al.

[11] Patent Number: 5,801,798

[45] Date of Patent: Sep. 1, 1998

[54] FAST SPEED LIQUID CRYSTAL PHASE SPATIAL LIGHT MODULATOR FOR ENCHANCED DISPLAY RESOLUTION

[75] Inventors: Diana Chen, Gilbert; Phil Wright; Thomas B. Harvey, III, both of Scottsdale, all of Ariz.

[73] Assignee: Motorola, Inc., Schaumburg, Ill.

[21] Appl. No.: 773,538

[22] Filed: Dec. 23, 1996

[51] Int. Cl.$^6$ .............................. G02F 1/1347; G02F 1/13
[52] U.S. Cl. ....................................... 349/74; 349/202
[58] Field of Search ............................. 349/74, 77, 202

[56] References Cited

U.S. PATENT DOCUMENTS 5,126,869  6/1992  Lipchak et al. ................. 349/74
5,307,073  4/1994  Riza ................................ 359/578
5,537,256  7/1996  Fergason ........................ 359/495

*Primary Examiner*—Anita Pellman Gross
*Attorney, Agent, or Firm*—Eugene A. Parsons

[57] ABSTRACT

A phase spatial light modulator composed of a liquid crystal cell and a liquid crystal polarization switch. The liquid crystal cell capable of creating a liquid crystal phase prism under the influence of an external voltage. The liquid crystal polarization switch capable of perpendicularly rotating the polarization of light impinging upon the liquid crystal polarization switch, prior to passage through the liquid crystal cell in response to an applied voltage. The modulator, or scanner, thereby capable of modulating the phase of light passing therethrough, resulting in a high resolution resultant integrated image.

22 Claims, 3 Drawing Sheets

FAST SPEED LIQUID CRYSTAL PHASE SPATIAL LIGHT MODULATOR FOR ENCHANCED DISPLAY RESOLUTION

FIELD OF THE INVENTION

The present invention pertains to the field of optical scanners, or beam steerers and the method of fabrication of such devices, and more particularly to the modulation of light resulting in the enhanced display resolution of a visual image.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of concern in the reduction in the size of visual displays, specifically those utilized in portable electronic devices, such as portable communications equipment, or the like, is the display resolution quality and the maintenance of minimal power requirements, simple drive circuitry and low manufacturing costs.

One alternative method of fabricating a miniature visual display is to utilize scanning techniques to create an integrated image generated from an image source having a minimal number of pixels. Of relevance in the reduction in size of visual displays utilizing scanning techniques, and the maintenance of resolution quality, is the human visual system's ability to process and integrate information, and the speed at which the visual system is able to do so. The human visual system can process information no faster than approximately 60 Hz. Therefore, an image that is projected and scanned within 1/60th of a second to varying positions within a visual display is seen by the eyes of the viewer as one enlarged integrated image. As an example, by moving an image of an "A" to six different locations within a visual display, at a frequency of 60 Hz, the viewer will see one integrated image composed of six "A"s. If the image is simultaneously content modulated, for example, the images are of six letters "A", "B", "C", "D", "E" and "F" that are individually and sequentially moved to six varying positions at a speed of 60 Hz., the viewer will see one integrated image composed of the six letters. This process, more commonly known as time-multiplexed imagery, can be utilized in the field of display technology through the use of scanners or beam steerers, and more specifically in the development of enhanced resolution miniature visual displays.

Scanning, or beam steering, devices utilized today aid in increasing the resolution of visual displays. These scanning devices can be found in many forms, most commonly electro-mechanical scanners incorporating mirrors, such as galvanometric scanners and polygonal scanners. These types of electro-mechanical scanners are commonly quite large in size, therefore not amenable to the incorporation into a display device that is small, lightweight, operates with low power consumption and is meant to be portable in nature. In addition, mechanical scanners are complex and thus expensive to manufacture and in many instances utilize great amounts of power during operation.

Recent invention has brought about new scanning devices that are capable of being fabricated small enough in size and power requirements so as to be incorporated into portable products, such as pixellated miniature liquid crystal phase spatial light modulators. This type of scanning device generally requires the use of a large number of interconnects to drive the device and achieve the desired number of phase changes. For instance, during operation varying voltages are required to be exerted upon specific areas of a liquid crystal cell dependent upon the phase shift required for that particular area of the cell. The result is a very complex drive circuitry where the required scanning angle is large or the scanning aperture is large. In addition, because of the large number of interconnects, manufacturing costs are increased.

Recent invention has also brought about non-pixellated scanning devices which record alignment information within at least one liquid crystal memory cell. More particularly a blazed phase grating is stored in a plurality of nematic liquid crystal memory cells which is turned "ON" and "OFF" by applying a voltage. This application of a voltage provides for a change in polarization, thus two-directional beam deflection of the light passing therethrough. While this system adequately provides for desired beam deflection, the polarization switching speed is relatively slow due to the required time it takes for the nematic liquid crystal molecules within the liquid crystal cells to relax to their original position.

Thus, there is a need for a small non-pixellated liquid crystal phase spatial light modulator scanning device including a liquid crystal cell and a liquid crystal polarization switch, that allows for the alignment of a liquid crystal material included within the liquid crystal cell, that in response to the switching of the polarization of light prior to passage of the light through the liquid crystal cell, allows for the light to be steered, or scanned, in response to the alignment of the liquid crystal material included within the liquid crystal cell.

Accordingly, it is highly desirable to provide for a scanning device, that utilizes a liquid crystal phase spatial light modulator for phase modulation composed of a liquid crystal cell and a liquid crystal polarization switch, that under the influence of an external voltage is capable of forming a phase prism in the scanning device, more particularly the liquid crystal cell, thereby providing for the scanning of light passing therethrough in response to input signals exerted upon the liquid crystal cell and the liquid crystal polarization switch.

It is a purpose of the present invention to provide a new and improved liquid crystal phase spatial light modulator for display resolution enhancement that is capable of spatially modulating light passing therethrough.

It is a still further purpose of the present invention to provide for a scanning device that is capable of directionally deflecting a beam of light dependent upon the polarization of the light passing therethrough in response to the alignment of a plurality of liquid crystal molecules in a liquid crystal cell.

It is yet another purpose of the present invention to provide for a scanning device that is capable of fast two-directional beam deflection utilizing a liquid crystal polarization switch and a liquid crystal cell.

It is a further purpose of the present invention to provide a liquid crystal phase spatial light modulator, or scanner, incorporated into a new and improved visual display system for display resolution enhancement, thereby allowing for the incorporation of the scanner into miniature visual displays.

SUMMARY OF THE INVENTION

The above problems and others are substantially solved and the above purposes and others are realized in a liquid crystal phase spatial light modulator comprised of at least one liquid crystal cell and a liquid crystal polarization switch. The liquid crystal polarization switch is capable of rotating the polarization of light passing therethrough in response to an external stimulus. The at least one liquid crystal cell is capable of creating a liquid crystal phase prism under the influence of an external voltage. The phase prism is electrically adjustable to deflect light impinging thereon in at least two different deflection angles dependent upon the external voltage applied thereto. The at least one liquid crystal cell is optically positioned so as to allow light passing through the liquid crystal polarization switch and having undergone a change in polarization, to pass therethrough the at least one liquid crystal cell and undergo optical deflection according to the electrically adjustable phase prism.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

The present invention is based on utilizing individually addressable visible light emitting devices formed in an array, that in combination with driver/control circuitry and optical elements compose a light emitting display device, or image source, of the present invention. To increase the resolution for a given number of light emitting devices or to reduce the number of light emitting devices needed to achieve a desired resolution, scanning techniques utilizing a liquid crystal phase spatial light modulator, hereinafter also referred to as a liquid crystal scanner, are employed. The light emitting display device serves as the image source for a visual display system whereby a resulting integrated image is formed by scanning portions or elements of the array of light emitting devices, through the liquid crystal scanner, thereby spatially modulating the phase of the light emitted by that portion. This phase modulation serves to change the directional travel and in essence "moves" the light to another portion of the display. More particularly, the scanner allows for a straight passage or an optical deflection of the light beam passing therethrough dependent upon the external stimulus applied thereto the liquid crystal cell and a liquid crystal polarization switch. This scanning action forms what appears to the observer to be a high resolution resultant integrated image. Those skilled in the art will appreciate that scanning allows a full page display to be created from a much smaller number of display devices than is necessary to generate the full page display. The resultant integrated image is viewable as one of a direct view image, a miniature virtual image, or a projected image.

The scanning process utilized in the present invention is based on the principle of spatial phase modulation, thereby altering the directional path of light emitted by portions or elements of the array of light emitting devices. Of concern in the fabrication of a resultant integrated image utilizing prior art scanning techniques, is the number of interconnects and complexity of the drive circuitry, thus the manufacturing costs.

In a preferred embodiment of the device of the present invention, the liquid crystal phase spatial light modulator is composed of at least one liquid crystal cell, having no defined pixels and capable of forming a liquid crystal phase prism in the presence of an exerted bias, such as a voltage ramp, and a liquid crystal polarization switch. Linearly polarized light entering the liquid crystal scanner device undergoes a change in polarization in response to an external stimulus applied to the liquid crystal polarization switch and subsequently a phase modulation as it passes through the liquid crystal cell dependent upon the bias exerted upon the liquid crystal cell to achieve reorientation of the liquid crystal molecules contained therein.

Figure 1:
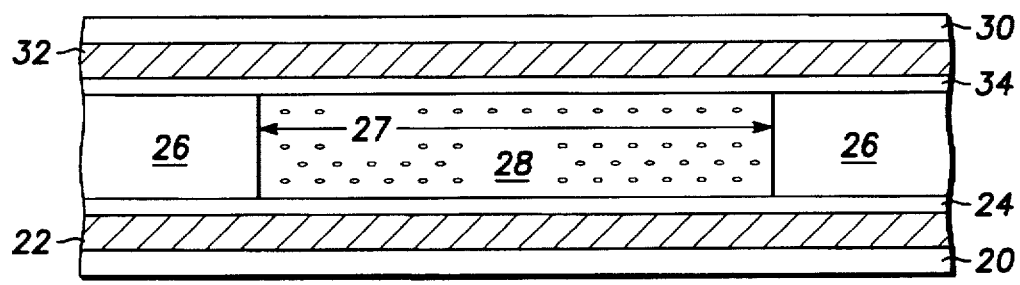
FIG. 1 is a simplified cross-sectional view of the liquid crystal cell component of the liquid crystal phase spatial light modulator of the present invention.

Referring now to the accompanying illustrations, disclosed is the fast speed liquid crystal modulator, or scanner, device of the present invention. It should be understood that the preferred embodiment of the liquid crystal scanner of the present invention is generally composed of a plurality of liquid crystal cells linearly aligned end to end. Referring specifically to FIG. 1, illustrated is a simplified and enlarged partial sectional view of an exemplary liquid crystal cell 12 for use in a preferred embodiment of a liquid crystal scanner of the present invention. Liquid crystal cell 12 is generally formed according to methods disclosed in U.S. patent application entitled "NEMATIC LIQUID CRYSTAL PHASE SPATIAL LIGHT MODULATOR FOR ENHANCED DISPLAY RESOLUTION", Ser. No. 08/651,188, filed May 17, 1996, assigned to the same assignee and incorporated herein by this reference and U.S. patent application entitled "VISUAL DISPLAY SYSTEM FOR DISPLAY RESOLUTION ENHANCEMENT", Ser. No. 08/638,709, filed Apr. 29, 1996, assigned to the same assignee and incorporated herein by this reference. More particularly, liquid crystal cell 12 is generally fabricated in a stack formation and includes a substrate 20 formed of any convenient optically transparent material, such as glass. A plurality of bond or terminal pads (not shown) are formed adjacent the edges of substrate 20 and are in electrical communication with a plurality of layers of control circuits formed of a plurality of layers of electrically conductive material (discussed presently). A first electrically conductive material layer 22 is formed on an upper surface of substrate 20. First electrically conductive material layer 22 is fabricated of an optically transparent material, such as indium tin oxide (ITO), thereby allowing the light impinging thereon to pass therethrough and defining an optically clear contact. A first molecular orientation layer 24 is positioned on the upper surface of transparent electrically conductive material layer 22. Molecular orientation layer 24 serves to properly position and align the molecules comprising the liquid crystal material (discussed presently), so as to orient the molecules in a specific direction when there does not exist any external stimulus, such as a voltage, acting upon liquid crystal cell 12.

A generally tubular glass spacer 26 is fixedly attached to the upper surface of molecular orientation layer 24 by any convenient means, such as adhesive, chemical bonding, growing and etching layers, etc. It will of course be understood that tubular glass spacer 26 is one example of a means for retaining the liquid crystal material within the cell formation. Alternatively, embodiments including end caps, an adhesive seal, or the like, could be formed so as to provide means for retaining the liquid crystal material within the cell formation. Accordingly, the present tubular glass spacer 26 structure is illustrated only for purposes of this explanation. Tubular glass spacer 26 has formed therein an inner opening 27. The cavity defined by inner opening 27 in tubular glass spacer 26, having internal opposed flat surfaces, in conjunction with the upper surface of molecular orientation layer 24, is filled with a continuous layer of liquid crystal material 28. Typical examples of liquid crystal material which can be used for this purpose are disclosed in U.S. Pat. No. 4,695,650, entitled "LIQUID CRYSTAL COMPOUNDS AND COMPOSITIONS CONTAINING SAME", issued Sep. 22, 1987 and U.S. Pat. No. 4,835,295, entitled "FERROELECTRIC LIQUID CRYSTAL COMPOUNDS AND COMPOSITIONS", issued May 30, 1989.

A glass plate 30 has a second layer of electrically conductive material 32, positioned thereupon to further define a second contact. It should be understood that electrically conductive material layers 22 and/or 32 can alternatively be patterned and would be configured orthogonal to each other so as to define individual pixels. Layer 32 is formed on a lower surface of glass plate 30, and defines a second contact which in conjunction with transparent electrically conductive material layer 22 and liquid crystal material 28 form liquid crystal cell 12. In the preferred embodiment the second contact is formed from an optically transparent material, such as indium-tin-oxide or the like.

The electrically conductive material layers 22 and 32 are connected by a conductive lead to a bond pad (not shown) adjacent the outer edges of tubular glass spacer 26. The bond pad is then electrically connected to a bond pad on substrate 20 by any convenient means, such as wire bond, a feed through connector in the edges of tubular glass spacer 26 (not shown), etc. The bond pad is adapted to have applied thereto a common potential, such as ground or some fixed voltage, which in cooperation with various potentials applied to the contacts activates and serves to apply a voltage to liquid crystal cell 12. A second molecular orientation layer 34 is formed thereon a lower surface of electrically conductive material layer 32. Liquid crystal material 28 is contained within the cavity defined by the upper surface of molecular orientation layer 24, inner opening 27 of tubular glass spacer 26 and lower surface of molecular orientation layer 34. It should be understood that in an alternative embodiment, liquid crystal material 28 includes spacers elements (not shown) mixed within the liquid crystal material, and utilizes an adhesive seal, or the like to retain the liquid crystal material within the cell, in lieu of a separate spacer element. It will be apparent to those skilled in the art that molecular orientation layers 24 and 34 can be formed in separate or discrete layers that are simply positioned on opposing sides of tubular glass spacer 26 and sandwiched therebetween the remaining layers during assembly. Alternatively, molecular orientation layers 24 and 34 are formed on top of conductive layer 32 by a process of thin film formation or some coating process and the layer is subsequently rubbed to give the alignment direction.

Figure 2:
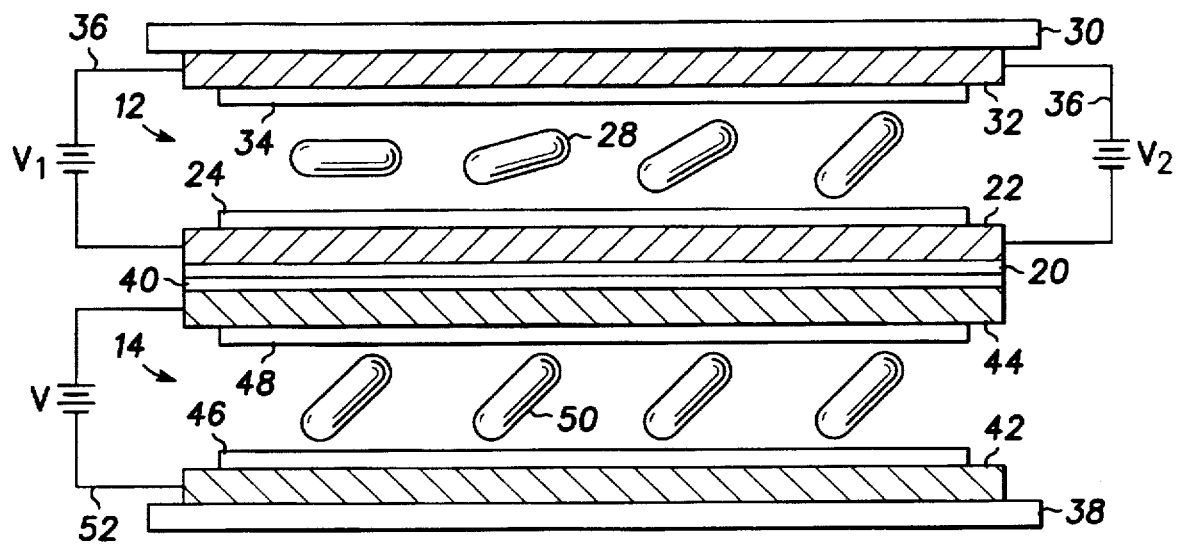
FIG. 2 is simplified cross-sectional view of the structure of a liquid crystal phase spatial light modulator according to the present invention.

While the present embodiment is described using liquid crystal material, it should be understood that other types of light modulating material might be utilized, including, for example, other types of light modulating liquid or solid material. The specific method of fabrication which may be utilized in the formation of the scanner of the present invention as well as the structure itself, are described with regard to FIG. 2, illustrating in simplified partial cross-sectional view the scanner structure according to the disclosed method of fabrication. Modulator 10 is generally composed of liquid crystal cell 12 and a liquid crystal polarization switch 14 optically aligned utilizing an optically transparent adhesive, or sharing a common intermediate substrate element, as previously discussed. In general, liquid crystal cell 12 is fabricated in generally stack formation, including a molecular alignment layer (discussed previously), therefore capable of forming a stepped phase prism in response to an external stimulus applied thereto, more particularly a voltage ramp applied thereto. It should be understood that throughout this disclosure when referring to a liquid crystal cell that various liquid crystal stack fabrications, and various liquid crystal materials, including nematic liquid crystal materials, can be provided which will operate in different modes in response to different signals or potentials applied thereto. More particularly, the phase prism is generated under the influence of a bias in a range so as to cause the optical index of the liquid crystal material to change linearly with the voltage applied. Accordingly, it can be stated that the optical index change of the liquid crystal material is a linear function of the voltage change.

The exact mode of operation of the scanner and the scanning technique to be utilized is dependent upon the fabrication of the array of light emitting devices of the light emitting device display chip and the configuration of an optical system (discussed presently) that are both incorporated into the visual display system of the present invention. It should be understood that the liquid crystal scanner of the preferred embodiment is non-pixelated. As illustrated in FIG. 2, a plurality of driver and control circuits 36 complete liquid crystal cell 12. The driver and control circuits have data input terminals and control signal output terminals connected to liquid crystal cell 12 through a plurality of connection or bond pads (not shown), for applying a potential, or voltage, thereto. Dependent upon the specific bias applied to liquid crystal cell 12, a phase prism is formed across liquid crystal cell 12. It should be understood that in the preferred embodiment a voltage ramp is applied to liquid crystal cell 12, resulting in an electrically adjustable phase prism. The phase prism is adjusted electrically for the desired deflection angle, thereby deflecting the light impinging thereon to desired angles.

Figure 3:
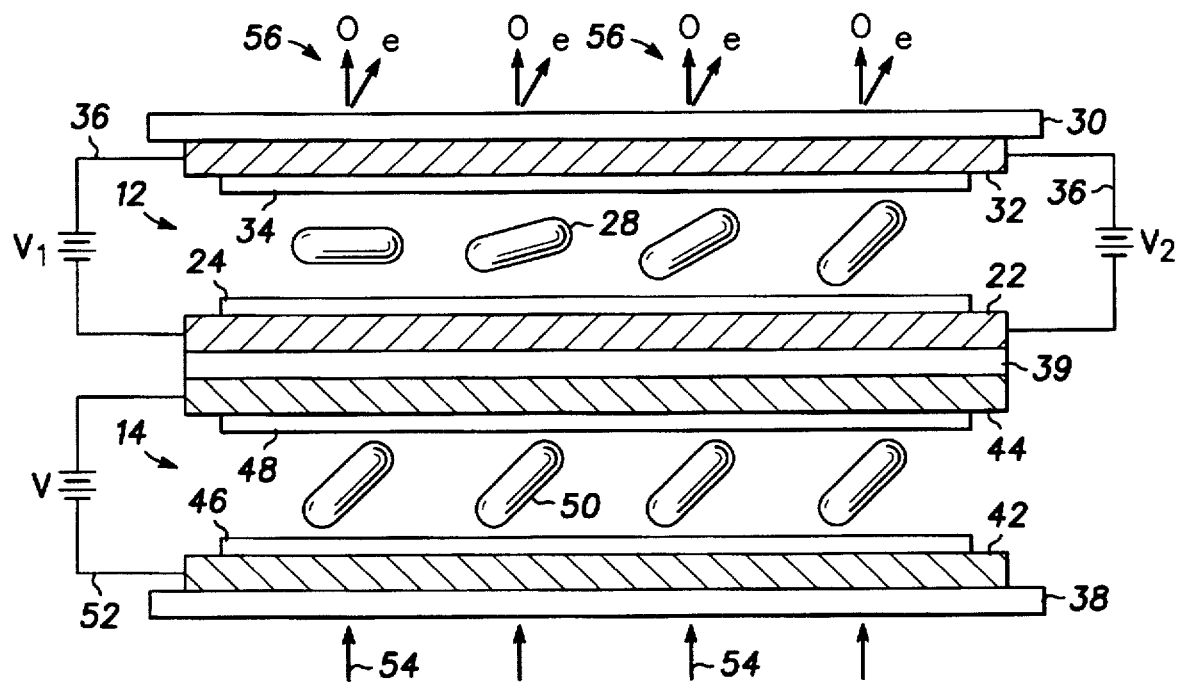
FIG. 3 is a simplified cross-sectional view of the liquid crystal phase spatial light modulator according to the present invention, illustrating the passage and subsequent deflection of light passing therethrough.

A second component, the liquid crystal polarization switch 14 is fabricated generally in stack formation. More particularly, liquid crystal polarization switch 14 is composed of a first substrate 38 and a second substrate 40 formed of any convenient optically transparent material, such as glass. It should be understood that in an alternative embodiment, liquid crystal cell 12 and liquid crystal polarization switch 14 can share a common intermediate substrate element 39 as illustrated in FIG. 3. A first conductive material layer 42 is formed on an upper surface of substrate 38 and a second conductive material layer 44 is formed on a lower surface of substrate 39/40. Electrically conductive material layers 42 and 44 are fabricated of an optically transparent material, such as indium tin oxide (ITO), thereby allowing the light impinging thereon to pass therethrough and defining an optically clear contact. A first molecular liquid crystal alignment, or orientation, layer 46 and a second molecular liquid crystal alignment layer 48 are positioned on a surface of each of the transparent electrically conductive material layers 42 and 44. Alignment layers 46 and 48 serve to properly position and align a plurality of molecules 50 comprising the liquid crystal material (discussed presently), so as to orient the molecules in a specific direction according to an external stimulus exerted thereon. It should be understood that while two separate alignment layers 46 and 48 are disclosed in this liquid crystal polarization switch fabrication, alternative fabrication utilizing only one single alignment layer is anticipated by this disclosure. Once this step in the fabrication process is complete the two substrate components are aligned, filled with a continuous layer of ferroelectric liquid crystal material composed of the plurality of liquid crystal molecules 50 thereby forming the liquid crystal polarization switch 14 component of the fast speed liquid crystal phase spatial light modulator, or scanner, 10. It should be understood that while specific types of liquid crystal material have been disclosed in the fabrication of liquid crystal cell 12 and liquid crystal polarization switch 14, other types of liquid crystal materials, as well as scanners utilizing other phase modulating materials are anticipated by this disclosure. Accordingly, typical examples of liquid crystal material which can be used for these purpose are disclosed in U.S. Pat. No. 4,695,650, entitled "LIQUID CRYSTAL COMPOUNDS AND COMPOSITIONS CONTAINING SAME", issued Sep. 22, 1987. In addition, it should be noted that this disclosure is not limited to scanning devices, and can apply to programmable focus/defocus lenses. More particularly, this concept of beam steering can be utilized in all beam steerers relying on birefringence effect steering, such as PLZT steerers, or the like.

The electrically conductive material layers 42 and 44 of liquid crystal polarization switch 14 form a first and second electrical contact and are connected and/or adapted to have applied thereto a common potential, such as ground or some fixed voltage, which serves to apply a voltage to polarization switch 14. Accordingly, there is provided a drive circuitry 52, capable of biasing liquid crystal polarization switch 14, thereby perpendicularly rotating the polarization of light impinging thereon. When no bias is acting upon liquid crystal polarization switch 14, there is no change in the polarization of light impinging thereon polarization switch 14 and the light passes straight through liquid crystal polarization switch 14 and impinges upon liquid crystal cell 12 in an unaltered state.

It should be understood that liquid crystal scanner 10 is illustrated as being composed of optically transparent material, for use when scanning in a transmissive mode. The use of optically transparent material allows for the positioning of liquid crystal phase spatial light modulator 10 within a visual display system, allowing for the passage of light, emitted by the light emitting display device, to pass directly through device 10.

Referring now to FIG. 3, during operation, light passing through fast speed liquid crystal phase spatial light modulator, or liquid crystal scanner, 10 undergoes a phase modulation dependent upon the polarization of the light and the biased voltage. It should be understood that the biased voltage determines the phase modulation, thus the light deflection angle of the liquid crystal cell. More particularly, the phase modulation is achieved by changing the optical index of the liquid crystal material contained within the cell, linearly as a function of the voltage change. Illustrated schematically in FIG. 3, more specifically utilizing directional arrows 54, is the passage of light impinging thereupon polarization switch 14 and the passage therethrough liquid crystal cell 12, illustrating the resultant directional path 56 of the exiting light. It should be noted that FIG. 3 illustrates the passage therethrough of light along the ordinary optical axis, referenced as "o", and the passage of light therethrough of light along the extraordinary optical axis, referenced as "e". More particularly, illustrated in FIG. 3 is the resultant phase modulation of the light passing through liquid crystal scanner 10 in response to the change in polarization of the light and alignment of liquid crystal molecules 28 (FIG. 1) of liquid crystal cell 12.

In the preferred embodiment, the device of the present invention operates in two distinct states. A first state of operation, allows for no change in polarization of the light passing therethrough. Accordingly, when the light is polarized for example along an x-direction, or having an axis of ordinary light along the x-axis, prior to entering the polarization switch, no change in polarization occurs and the light passes therethrough liquid crystal cell 12 without undergoing a change in phase. More specifically, light entering liquid crystal cell 12 that is polarized along the ordinary axis is not affected, or modulated, by nematic liquid crystal material, that typically included within liquid crystal cell 12 of the preferred embodiment. In a second state of operation, that in which a change in polarization occurs, an external stimulus is applied to liquid crystal polarization switch 14, thereby perpendicularly rotating the polarization of the light passing therethrough. It should be understood that the state of polarization is dependent upon the degree of bias. More specifically, if light entering polarization switch 14 is linearly polarized again along the x-axis, or having an axis of ordinary light along the x-axis, once it passes through the biased liquid crystal polarization switch 14, a change occurs whereby the light is then polarized along the y-axis or along the extraordinary axis, resulting in a change in phase, or deflection, of the light passing therethrough.

Instead of utilizing defined pixels, the scanner of the present invention utilizes specific phase information generated at predetermined intervals across liquid crystal cell 12, thereby forming an electrically controlled phase prism. The nematic liquid crystal included within liquid crystal cell 12 is generally in a quasi-static state, to which an applied voltage can be adjusted to achieve the desired beam deflection angle. The resulting phase modulation allows for the image source, having minimal pixel numbers and low fill factor, in combination with liquid crystal scanner 10 composed of the at least one liquid crystal cell 12 having molecular alignment generated as a result of an applied bias, and liquid crystal polarization switch 14, to generate an integrated image by modulating the phase of light emitted therethrough in response to the presence or lack of voltage exerted thereupon. The resultant image appears to be composed of a much greater number of pixels, thus enhanced display resolution. In addition, larger steering angles can be achieved, as well as a device that operates at a faster speed.

As previously stated, the purpose of this disclosure is to provide for a fast speed liquid crystal phase spatial light modulator, or scanner. The scanner as disclosed can be utilized in a miniature visual display system, composed of a light emitting display device, the scanner, driver/control circuitry, and a plurality of optical elements. In the preferred embodiment, the use of miniature liquid crystal scanner 10 to bring about the phase modulation of the light emitted by a display device, allows or the display system to remain small in size and permits it to be incorporated into miniature visual displays such as those found in portable electronics equipment, or the like. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array each capable of emitting light of a specific phase. It should also be understood that when utilizing these alternative light or image sources, that additional filters and/or optical elements may be required in addition to those described for the preferred embodiment. The general term "light emitting devices" will be utilized throughout this disclosure for the sake of simplicity. It should further be understood that the fast speed liquid crystal phase spatial light modulator and method of fabrication as disclosed is additionally anticipated to aid in scanning or beam steering in other electro-optical devices, such as target tracking devices, weaponry, printing devices, image scanning devices, and optical communications and telecommunications devices, such as in optical computing devices, optical switching devices, optical storage devices, or the like.

Thus, disclosed is a new and improved fast speed liquid crystal phase spatial light modulator including a liquid crystal polarization switch and a liquid crystal cell. The liquid crystal polarization switch capable of changing the polarization of linearly polarized light impinging thereon in response to an external stimulus. The liquid crystal cell responsive to an exerted bias, thereby forming an electrically controlled phase prism, to which the applied bias can be adjusted to achieve desired deflection angles of light impinging thereon. The scanner device of the present invention operates by modulating the phase of light passing therethrough in response to a change in polarization of light and phase information. The liquid crystal scanner of the present invention is meant to be incorporated into a visual display system, more specifically an electro-optical system, additionally composed of a light emitting display device which serves as an image source, driver/control circuitry and optical elements (discussed presently). During operation, the scanner of the present invention serves to shift the pixels of the individual array, groups of pixels of the array, or alternatively serves to shift the entire array, thereby creating enhanced resolution through phase modulation. Further information regarding the shifting of pixels, pixel groups, and arrays can be found in U.S. patent application entitled "VISUAL DISPLAY SYSTEM FOR DISPLAY RESOLUTION ENHANCEMENT", Ser. No. 08/638,709, filed Apr. 29, 1996, assigned to the same assignee and incorporated herein by this reference.

The visual display system includes various additional optical components while conveniently integrating electrical connections to the components and providing external connections thereto. Light sources, polarizer element(s), diffusers and optics are conveniently integrated into the system which is easily integrated into portable electronic equipment. It is further disclosed that additional optical elements, such as polarizer elements, plates, or layers, refractive elements, diffractive elements, etc. may be easily positioned exterior the visual display system or as a part of scanner device 10.

It should be understood that the resultant integrated image generated by the visual display system, composed of the image source, or light emitting display device, the phase spatial light modulator, driver/control circuits and various optical elements, is too small to properly perceive (fully understand) with the human eye and generally requires a magnification of at least 10× for comfortable and complete viewing. Accordingly, a visual display system of the present invention is typically formed within a housing, defining an optical magnifier, having integrally formed therein an optical magnification system. The optical magnifier is generally defined by a plurality of sides which compose the housing. Several examples of optical magnifiers with optical magnification systems which may have incorporated therein the liquid crystal scanner 10 of the present invention are illustrated in FIGS. 4–8, explained below.

Figure 4:
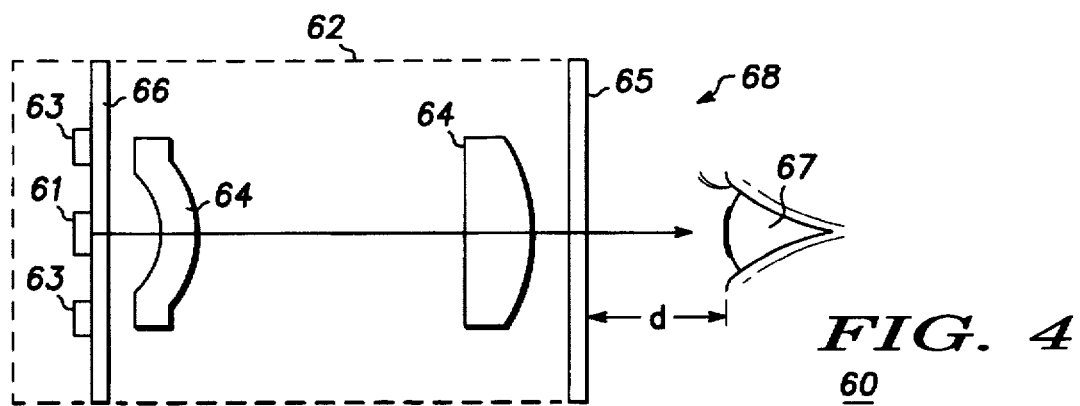
FIG. 4 is a simplified schematic view of a miniature visual image display incorporating the liquid crystal phase spatial light modulator of the present invention.

Referring to FIG. 4, a miniature visual image display 60 is illustrated in a simplified schematic view. Miniature visual image display 60 is defined by housing 62 and includes an image generation apparatus 61 for providing an image, and drivers 63 mounted to a substrate 66. An optical system, represented by optical elements 64, is positioned in spaced relation to image generation apparatus 61 of miniature visual image display 60. A transmissive phase spatial light modulator 65, generally similar to liquid crystal scanner 10, previously described, is positioned to allow the light emitted by image generation apparatus 61 to pass therethrough and produce an image viewable by an eye 67 spaced from an aperture 68.

In operation, the light generated by image generation apparatus 61 passes through optical elements 64 and scanner 65. External voltages are applied to scanner 65, thereby resulting in a desired change in polarization of the light emitted by a plurality light emitting devices of image generation apparatus 61 and to achieve the desired deflection angle within the electrically adjusted phase prism. The achieved scanning of the image creates a resultant integrated image viewable by the eye 67 of the observer through aperture 68 which appears to have a greater number of pixels and an increased aperture ratio, even though the number of pixels of the image generation apparatus 41 remains the same.

Optical elements 64, represented schematically by a plurality of optical elements mounted in spaced relation from image generation apparatus 61, receive the image from image generation apparatus 61 and magnify it an additional predetermined amount. It will of course be understood that the magnification and/or correction can be provided by any number or type of optical element and may be adjustable for focus and additional magnification, if desired, or may be fixed in a separate housing for simplicity. It should be noted that additional optical elements can be provided exterior the miniature visual image display 60 for further image magnification and/or correction.

Eye relief is the distance that eye 67 can be positioned from viewing aperture 68 and still properly view the image, which distance is denoted by "d" in FIG. 4. Because of the size of lens system, more particularly optical elements 64, eye relief, or the distance d, is sufficient to provide comfortable viewing and in the present embodiment is great enough to allow a viewer to wear normal eyeglasses, if desired.

Figure 7:
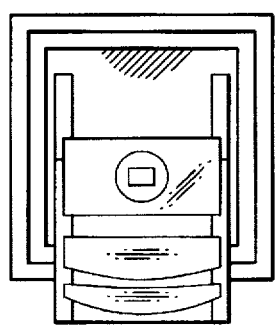
FIGS. 5, 6 and 7 illustrate a front view, side elevational view, and a top plan, respectively, of an image manifestation apparatus utilizing the liquid crystal phase spatial light modulator of the present invention.
Figure 5:
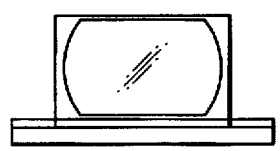
Figure 6:
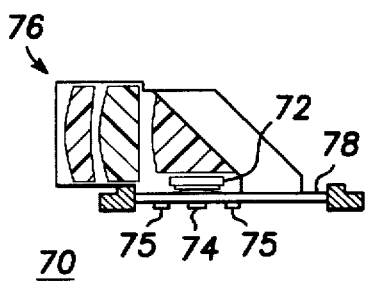

Referring now to FIGS. 5, 6 and 7, another miniature visual image display 70, in accordance with the present invention, is illustrated in a front view, side elevational view, and top plan, respectively. FIGS. 5, 6 and 7 illustrate miniature visual image display 70 approximately the actual size to provide an indication as to the extent of the reduction in size achieved by the present invention. Miniature visual image display 70 includes a transmissive fast speed liquid crystal phase spatial light modulator 72, hereinafter referred to as liquid crystal scanner 72, (generally similar to liquid crystal phase spatial light modulator 10, described above), an image generation apparatus 74, a plurality of driver/control circuits 75, and a plurality of optical elements, which comprise an optical magnification system 76. Image generation apparatus 74 is mounted in electrical interface with a standard printed circuit board 78. Liquid crystal phase spatial light modulator 72 is mounted to optical magnification system 76, thereby allowing the light emitted by image generation apparatus 74 to pass through liquid crystal scanner 72 and exit the folded optical magnifier formed by optical magnification system 76. It should be understood that scanner 72 can alternatively be mounted elsewhere within display 70.

Figure 8:
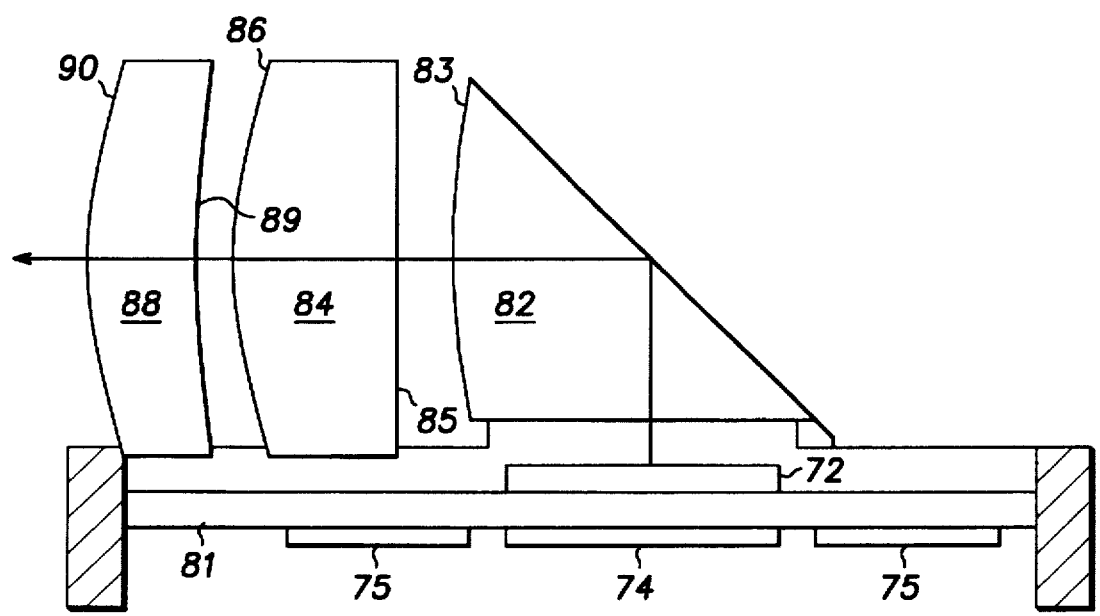
FIG. 8 is a 4× magnified view in side elevation of the apparatus of FIG. 5 utilizing the liquid crystal phase spatial light modulator of the present invention.

FIG. 8, illustrates a 4× magnified view in side elevation of the miniature visual image display of FIG. 5, referenced here as 70, utilizing the liquid crystal phase spatial light modulator of the present invention. From this view it can be seen that a liquid crystal scanner 72 (generally similar to liquid crystal phase spatial light modulator 10 above) is affixed directly to the upper surface of a mounting substrate 81 to which an image generation apparatus 74 and driver/control circuits 75 are mounted. An optical prism 82 is mounted to reflect the image generated by liquid crystal scanner 72 through a refractive surface 83. The image is then directed to an optical lens 84 having a refractive inlet surface 85 and a refractive outlet surface 86. From optical lens 84 the image is directed to an optical lens 88 having an inlet refractive surface 89 and an outlet refractive surface 90. Also, in this embodiment at least one diffractive optical element is provided on one of the surfaces, e.g. surface 83 and/or refractive inlet surface 85, to correct for chromatic and other aberrations. The operator looks into outlet refractive surface 90 of optical lens 88 and sees a large, easily discernible visual image which appears to be behind miniature visual image display 70.

It is anticipated by this disclosure that the plurality of optical elements disclosed in FIGS. 4–8, include reflective elements, refractive elements, diffractive elements, polarizer elements, diffusers, or holographic lenses that may be mounted in overlying relationship to the image generation apparatus, specifically positioned on an interior aspect of the optical magnifiers. It is further disclosed that a plurality of optical elements, including reflective elements, refractive elements, diffractive elements or diffusers may be mounted in overlying relationship to the surface of the optical magnifier through which the light, or resultant integrated image, is output, specifically positioned on an exterior aspect of a light output surface, to form an image plane for the light which forms the resultant integrated image.

Fast speed liquid crystal phase spatial light modulator 10 of the present invention is meant to be incorporated into any number of varying visual image display systems, some of which have been previously described herein. These types of visual image display systems are ultimately intended for use in various types of electronic equipment, namely portable communications equipment, such as cellular and portable telephones, as well as smart-card reader devices, or the like. Liquid crystal phase spatial light modulator 10 is additionally anticipated to aid in scanning or beam steering in other electro-optical devices, such as target tracking devices, weaponry, printing devices, image scanning devices, and within the optical communication and telecommunication fields, such as for use in optical computing, optical switching, optical storage or the like.

Thus, a new and improved liquid crystal phase spatial light modulator composed of a liquid crystal polarization switch, capable of perpendicularly rotating the polarization of light impinging thereupon in response to an external stimulus and a liquid crystal cell which serves to spatially modulate the phase of light emitted by a light emitting display device passing therethrough is disclosed which is relatively easy and inexpensive to manufacture. The liquid crystal phase spatial light modulator of the present invention is intended for use in miniature visual display systems. The visual display system components ruggedly mount an image source, various optical components and the liquid crystal phase spatial light modulator scanning device, while conveniently integrating electrical connections to the components and providing external connections thereto. Light sources, polarizers, diffusers and, if desired, additional optics are conveniently integrated into the small visual display system which is easily integrated into a housing, forming an optical magnifier, for use in portable electronic equipment. It is further disclosed that additional optical elements, such as polarizer plates or layers, refractive elements, diffractive elements, etc. may be easily positioned exterior the housing. By using light emitting devices for the light source, with low fill factors, which are scanned by the liquid crystal phase spatial light modulator to generate a resultant integrated image, characterized by high resolution, the size of the system is further reduced and the electrical power required is also minimized.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A liquid crystal phase spatial light modulator comprising:
   a liquid crystal polarization switch capable of rotating the polarization of light passing therethrough in response to an external stimulus; and
   at least one non-pixelated liquid crystal cell including a plurality of continuous layers of conductive material and at least one molecular liquid crystal alignment layer, the at least one liquid crystal cell capable of creating a liquid crystal phase prism under the influence of an external voltage, electrically adjustable to deflect light impinging thereon in at least two different deflection angles dependent upon the external voltage applied thereto, the at least one liquid crystal cell optically positioned so as to allow light passing through the liquid crystal polarization switch and having undergone a change in polarization, to pass therethrough the at least one liquid crystal cell and undergo optical deflection according to the electrically adjustable phase prism.

2. A liquid crystal phase spatial light modulator as claimed in claim 1 wherein the liquid crystal phase spatial light modulator is incorporated into a miniature visual image display, thereby providing for enhanced display resolution.

3. A liquid crystal phase spatial light modulator as claimed in claim 1 wherein the liquid crystal phase spatial light modulator is utilized in at least one of optical communication devices, telecommunication devices, target tracking devices, weaponry, printing devices, and image scanning devices.

4. A liquid crystal phase spatial light modulator as claimed in claim 3 wherein the at least one of optical communication devices and telecommunication devices includes optical storage devices, optical switching devices and optical computing devices.

5. A liquid crystal phase spatial light modulator as claimed in claim 1 wherein the at least one liquid crystal cell and the liquid crystal polarization switch are optically aligned utilizing optically transparent adhesive.

6. A liquid crystal phase spatial light modulator as claimed in claim 1 wherein the at least one liquid crystal cell and the liquid crystal polarization switch are fabricated to share at least one common intermediate substrate element.

7. A liquid crystal phase spatial light modulator as claimed in claim 1 wherein the at least one liquid crystal cell includes nematic liquid crystal material.

8. A liquid crystal phase spatial light modulator as claimed in claim 1 wherein the liquid crystal polarization switch includes ferroelectric liquid crystal material.

9. A liquid crystal phase spatial light modulator as claimed in claim 1 wherein the liquid crystal polarization switch includes nematic liquid crystal material.

10. A liquid crystal phase spatial light modulator as claimed in claim 1 wherein the liquid crystal polarization switch is capable of perpendicularly rotating the polarization of light impinging thereupon in response to an external stimulus exerted upon the liquid crystal polarization switch.

11. A liquid crystal phase spatial light modulator comprising:

a liquid crystal polarization switch capable of perpendicularly rotating the polarization of light impinging thereupon in response to an external stimulus exerted upon the liquid crystal polarization switch; and at least one non-pixelated liquid crystal cell capable of creating an electrically adjustable phase prism, adjustable dependent upon a desired deflection angle, in a plurality of nematic liquid crystal molecules contained therein, the at least one liquid crystal cell including at least two substrate elements each having positioned thereon a continuous layer of conductive material and a molecular alignment layer, the molecular alignment layers having positioned therebetween a continuous layer of liquid crystal material, the at least one liquid crystal cell optically positioned so as to allow light passing through the liquid crystal polarization switch and having undergone a change in polarization, to pass therethrough the at least one liquid crystal cell and undergo optical deflection according to the electrically adjustable phase prism.

12. A liquid crystal phase spatial light modulator as claimed in claim 11 wherein the at least one liquid crystal cell and the liquid crystal polarization switch are optically aligned utilizing one of an optically transparent adhesive and a common intermediate substrate element.

13. A liquid crystal phase spatial light modulator as claimed in claim 11 wherein the liquid crystal polarization switch includes one of ferroelectric liquid crystal material and nematic liquid crystal material.

14. A liquid crystal phase spatial light modulator as claimed in claim 11 wherein the at least one liquid crystal cell has applied thereto a voltage ramp thereby forming the electrically adjustable phase prism.

15. A liquid crystal phase spatial light modulator as claimed in claim 14 wherein the at least one liquid crystal cell is fabricated to include a molecular liquid crystal alignment layer providing molecular alignment of a plurality of liquid crystal molecules contained within the at least one liquid crystal cell in response to the voltage ramp, thereby forming the electrically adjustable phase prism.

16. A liquid crystal phase spatial light modulator as claimed in claim 11 wherein the liquid crystal material is a nematic liquid crystal material.

17. A visual display system comprising:

an image source, comprised of a plurality of light emitting devices, each of the plurality of light emitting devices capable of emitting light of a specific phase;

a phase spatial light modulator, composed of a liquid crystal polarization switch capable of perpendicularly rotating the light impinging thereupon and at least one non-pixelated liquid crystal cell including a plurality of continuous layers of a conductive material, the liquid crystal cell capable of deflecting the light impinging thereupon in response to an applied voltage ramp; and drive circuitry connected to the plurality of light emitting devices and drive circuitry connected to phase spatial light modulator for delivering a voltage across the liquid crystal polarization switch and for delivering the applied voltage ramp to the at least one liquid crystal cell, thereby changing the polarization and resultant phase of the light passing therethrough, and generating a resultant integrated image viewable by an observer.

18. A visual display system as claimed in claim 17 further including a polarizer element, capable of linearly polarizing the light emitted by the image source.

19. A visual display system as claimed in claim 17 wherein the plurality of light emitting devices include one of inorganic light emitting diodes, organic light emitting diodes, field emission displays, cathode ray tubes, vertical cavity surface emitting lasers, liquid crystal displays, and electroluminescent devices.

20. A visual display system as claimed in claim 19 wherein the plurality of light emitting devices of the image source are formed in a two-dimensional array.

21. A visual display system as claimed in claim 19 wherein the at least one liquid crystal cell includes nematic liquid crystal material and the liquid crystal polarization switch includes one of nematic liquid crystal material and ferroelectric liquid crystal material.

22. A visual display system as claimed in claim 19 wherein the at least one liquid crystal cell and the liquid crystal polarization switch are optically aligned utilizing one of a common intermediate substrate element and an optically transparent adhesive.

\* \* \* \* \*